US010096050B2

United States Patent
Purcell et al.

(10) Patent No.: US 10,096,050 B2
(45) Date of Patent: Oct. 9, 2018

(54) SYSTEMS AND METHODS FOR MANAGING GROUP CHATS DURING ECOMMERCE SESSIONS

(71) Applicant: MasterCard International Incorporated, Purchase, NY (US)

(72) Inventors: Kimberly Purcell, Wilton, CT (US); Adam K. Hosp, Lake St. Louis, MO (US); Malavika Singh, New York, NY (US); David C. Brown, Dardenne Prairie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 536 days.

(21) Appl. No.: 14/820,781

(22) Filed: Aug. 7, 2015

(65) Prior Publication Data

US 2016/0042420 A1    Feb. 11, 2016

Related U.S. Application Data

(60) Provisional application No. 62/035,106, filed on Aug. 8, 2014.

(51) Int. Cl.
*G06Q 30/06* (2012.01)
*G06Q 20/12* (2012.01)
(Continued)

(52) U.S. Cl.
CPC ......... *G06Q 30/0613* (2013.01); *G06Q 20/12* (2013.01); *G06Q 30/0605* (2013.01);
(Continued)

(58) Field of Classification Search
None
See application file for complete search history.

(56) References Cited

U.S. PATENT DOCUMENTS 6,901,379 B1 * 5/2005 Balter .................... G06Q 30/06
                                                434/395
7,219,072 B1   5/2007 Sundaresan
                   (Continued)

FOREIGN PATENT DOCUMENTS

| KR | 1020050056167 a | 6/2005 |
| KR | 101192826 B1 | 12/2012 |
| KR | 20140050766 A | 4/2014 |

OTHER PUBLICATIONS

Brown, E., "9 Ways to Win on the Web," Fortune, vol. 139, Issue 10, pp. 112-121, May 24, 1999.*

(Continued)

*Primary Examiner* — Nicholas D Rosen
(74) *Attorney, Agent, or Firm* — Armstrong Teasdale LLP

(57) ABSTRACT

A computer implemented method for managing a group chat during an ecommerce session is provided. The method includes initiating a chat session between at least a first client computer device associated with a first participant and a second client computer device associated with a second participant, and sharing at least one view of an ecommerce website with the first client computer device and the second client computer device. The first client computer device and the second client computer device are configured to display the at least one view of the ecommerce website. The at least one view includes at least one purchasable item. The method also includes initiating a purchase transaction for the at least one purchasable item included in the at least one view, receiving payment information for the purchase transaction, and completing the purchase transaction based on the payment information.

20 Claims, 8 Drawing Sheets

(51) Int. Cl.
*H04L 12/18* (2006.01)
*H04L 12/58* (2006.01)

(52) U.S. Cl.
CPC ....... *G06Q 30/0643* (2013.01); *H04L 12/185* (2013.01); *H04L 12/1813* (2013.01); *H04L 12/1822* (2013.01); *H04L 51/10* (2013.01); *G06Q 30/0617* (2013.01); *G06Q 30/0619* (2013.01); *G06Q 30/0641* (2013.01)

(56) References Cited

U.S. PATENT DOCUMENTS

| | | | | |
|---|---|---|---|---|
| 8,170,919 | B2 * | 5/2012 | Barbour | G06Q 10/10 705/26.1 |
| 8,386,340 | B1 * | 2/2013 | Feinstein | G06Q 30/02 705/27.1 |
| 8,528,003 | B2 * | 9/2013 | Everett-Church | G06F 9/542 719/313 |
| 2005/0108033 | A1 * | 5/2005 | Everett-Church | G06F 9/542 719/328 |
| 2006/0075037 | A1 * | 4/2006 | Rothschild | G06Q 10/107 709/206 |
| 2010/0017307 | A1 | 1/2010 | Barbour et al. | |
| 2011/0041083 | A1 | 2/2011 | Gabai et al. | |
| 2011/0167481 | A1 * | 7/2011 | Ganz | G06Q 30/0222 726/5 |
| 2012/0109765 | A1 * | 5/2012 | Araque | G06Q 30/0601 705/26.1 |
| 2012/0151383 | A1 * | 6/2012 | Kazan | G06Q 10/101 715/753 |
| 2012/0185355 | A1 | 7/2012 | Kilroy | |
| 2012/0297314 | A1 * | 11/2012 | Stein | G06Q 10/10 715/751 |
| 2013/0046679 | A1 | 2/2013 | Davoust | |
| 2013/0132240 | A1 * | 5/2013 | Aguilar | G06Q 30/00 705/27.2 |
| 2013/0215116 | A1 | 8/2013 | Siddique et al. | |
| 2013/0268331 | A1 | 10/2013 | Bitz et al. | |
| 2014/0019884 | A1 | 1/2014 | Dinan et al. | |
| 2014/0052576 | A1 * | 2/2014 | Zelenka | G06Q 30/00 705/26.41 |
| 2014/0058939 | A1 | 2/2014 | Savla | |
| 2014/0089135 | A1 * | 3/2014 | Linh | G06Q 30/0601 705/26.7 |
| 2014/0100931 | A1 | 4/2014 | Sanchez et al. | |
| 2014/0136435 | A1 | 5/2014 | Nuzzi | |
| 2014/0278998 | A1 * | 9/2014 | Systrom | G06Q 30/0277 705/14.57 |
| 2014/0351080 | A1 | 11/2014 | Lowinger | |
| 2014/0351130 | A1 * | 11/2014 | Cheek | G06Q 20/29 705/44 |

OTHER PUBLICATIONS

PCT International Search Report and Written Opinion for related PCT Application No. PCT/US2015/044172 dated Nov. 19, 2015; 11 pp.

KR Office Action for related application 10-2017-700634 dated Jun. 11, 2018; 11 pp.

JP Office Action for related application 2017-506832 dated May 14, 2018; 4 pp.

* cited by examiner

SYSTEMS AND METHODS FOR MANAGING GROUP CHATS DURING ECOMMERCE SESSIONS

CROSS REFERENCE TO RELATED APPLICATIONS

This application claims the benefit of U.S. Provisional Application No. 62/035,106 filed Aug. 8, 2014, which is hereby incorporated by reference in its entirety.

BACKGROUND OF THE DISCLOSURE

This invention relates generally to electronic group chat and, more particularly, to computer implemented methods and systems for managing electronic group chats during an ecommerce session.

Different types of communication tools have been developed to allow users to communicate over a network (e.g., the Internet, an intranet, etc.). One popular type of communication tool is electronic chat (also sometimes called instant messaging or IM). Chat allows users to communicate over a network in real time. A client program (called a chat client) is typically used to participate in chat communication. A user typically types text in a chat client and the typed text is passed, by a chat service, to the chat client of each user in the communication (e.g., in the same chat room). Chat communication may be communication between, and only visible to, two users, multiple users, and/or groups of users. Known chat communication systems also allow users to send images, animations, sounds, and links to websites.

When multiple individuals contribute money to complete an ecommerce transaction, one individual usually uses his or her payment card to complete the transaction and pays a total purchase amount. The individual collects a portion, or share, of the total purchase amount from each of the other individuals. In many cases, each portion is collected in the form of a check or cash as it is difficult for individuals to transfer money using credit cards. There also may be a delay between the completion of the transaction and when all of the portions are collected.

BRIEF DESCRIPTION OF THE DISCLOSURE

In one embodiment, a computer implemented method for managing a group chat during an ecommerce session is provided. The method uses an ecommerce chat server in communication with a memory. The method includes initiating, by the ecommerce chat server, a chat session between at least a first client computer device associated with a first participant and a second client computer device associated with a second participant, and sharing, by the ecommerce chat server, at least one view of an ecommerce website with the first client computer device and the second client computer device. The first client computer device and the second client computer device are configured to display the at least one view of the ecommerce website. The at least one view includes at least one purchasable item. The method also includes initiating, by the ecommerce chat server, a purchase transaction for the at least one purchasable item included in the at least one view, receiving payment information for the purchase transaction, and completing the purchase transaction based on the payment information.

In another embodiment, an ecommerce chat server for managing a group chat during an ecommerce session is provided. The ecommerce chat server includes one or more processors communicatively coupled to one or more memory devices. The ecommerce chat server is configured to initiate a chat session between at least a first client computer device associated with a first participant and a second client computer device associated with a second participant, and share at least one view of an ecommerce website with the first client computer device and the second client computer device. The first client computer device and the second client computer device are configured to display the at least one view of the ecommerce website. The at least one view includes at least one purchasable item. The ecommerce chat server is also configured to initiate a purchase transaction for the at least one purchasable item included in the at least one view, receive payment information for the purchase transaction, and complete the purchase transaction based on the payment information.

In yet another embodiment, at least one non-transitory computer-readable storage media having computer-executable instructions embodied thereon is provided. When executed by an ecommerce chat server having at least one processor coupled to at least one memory device, the computer-executable instructions cause the processor to initiate a chat session between at least a first client computer device associated with a first participant and a second client computer device associated with a second participant and share at least one view of an ecommerce website with the first client computer device and the second client computer device. The first client computer device and the second client computer device are configured to display the at least one view of the ecommerce website. The at least one view includes at least one purchasable item. The computer-executable instructions also cause the processor to initiate a purchase transaction for the at least one purchasable item included in the at least one view, receive payment information for the purchase transaction, and complete the purchase transaction based on the payment information.

BRIEF DESCRIPTION OF THE DRAWINGS

FIG. 1 is a schematic diagram illustrating an example multi-party transaction card industry system for enabling ordinary payment-by-card transact in which merchants and card issuers do not need to have a one-to-one special relationship.

FIG. 2 is a simplified block diagram of an example computer system used for valuing a merchant in accordance with one example embodiment of the present disclosure.

FIG. 3 illustrates an example configuration of a client computer device shown in FIG. 2, in accordance with one embodiment of the present disclosure.

FIG. 4 illustrates an example configuration of the server system shown in FIG. 2, in accordance with one embodiment of the present disclosure.

FIG. 5 is a flowchart illustrating an example of a process of managing a chat session and a payment transaction while navigating the ecommerce website using the system shown in FIG. 2, in accordance with one embodiment of the disclosure.

FIG. 6 is a flowchart illustrating an example of a process of initiating and managing a chat session while navigating the ecommerce website using the system shown in FIG. 2, in accordance with one embodiment of the disclosure.

FIG. 7 is a flowchart illustrating an example of a process of managing receiving contributions from more than one cardholder to pay for a payment transaction on the ecommerce website using the system shown in FIG. 2, in accordance with one embodiment of the disclosure.

FIG. 8 is a diagram of components of one or more example computing devices that may be used in the system shown in FIG. 2.

DETAILED DESCRIPTION OF THE DISCLOSURE

Figure 1:
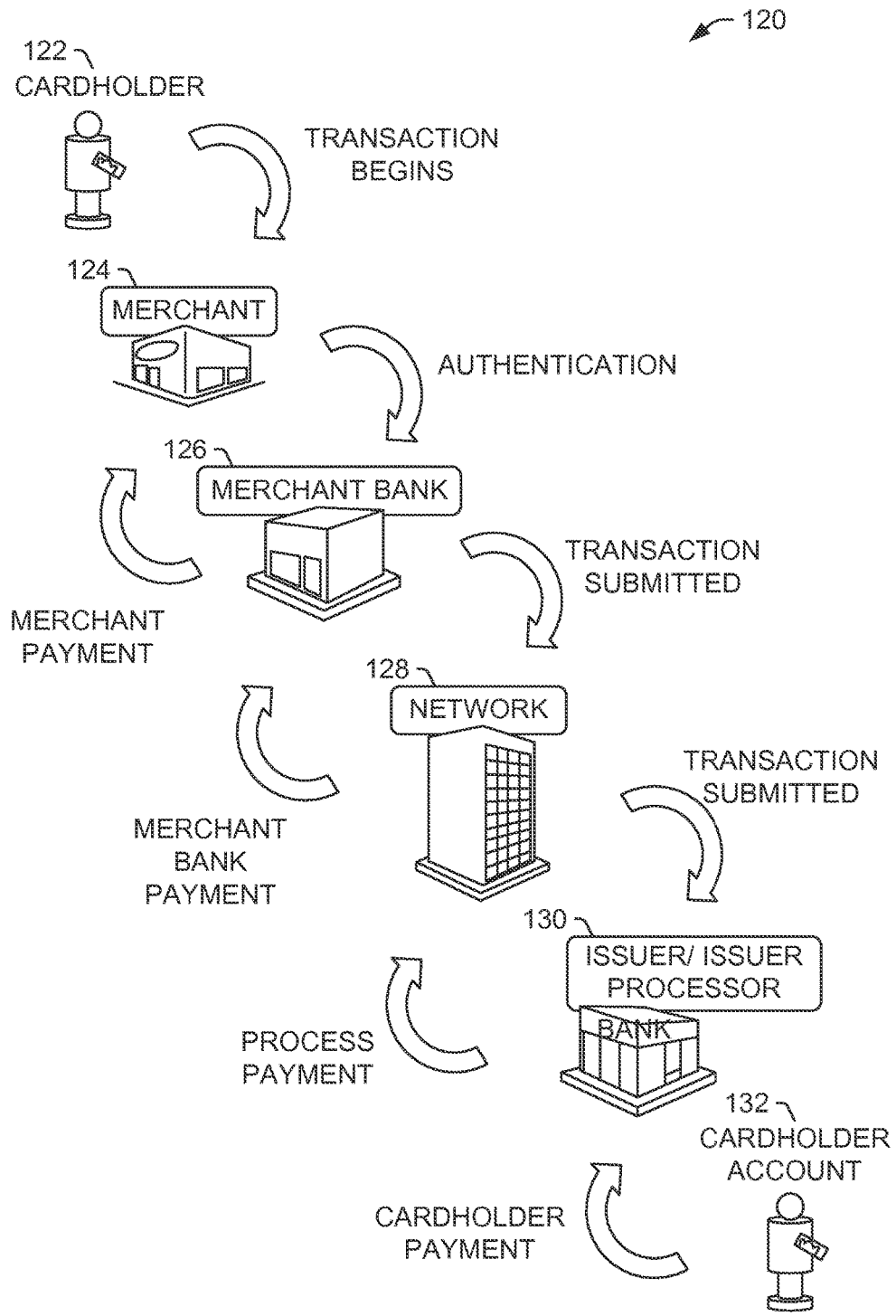
FIGS. 1-8 show example embodiments of the methods and systems described herein.

The following detailed description illustrates embodiments of the disclosure by way of example and not by way of limitation. The description clearly enables one skilled in the art to make and use the disclosure, and describes several embodiments, adaptations, variations, alternatives, and uses of the disclosure, including what is presently believed to be the best mode of carrying out the disclosure. The disclosure is described as applied to an example embodiment, namely, systems and methods for managing electronic group chats during an ecommerce session. More specifically, the disclosure describes an ecommerce chat server configured to manage chat communications between multiple participants, guide ecommerce website navigation for the multiple participants, and process payment transactions for the ecommerce website where multiple participants each are capable of paying a portion of the total transaction amount to a merchant associated with the ecommerce website.

In some embodiments, an ecommerce chat server controls a client chat application on client computer devices that allows the ecommerce chat server to control the display of the client computer devices during a chat session between the client computer devices. In other embodiments, the ecommerce chat server transmits instructions to the client computer devices participating in the chat session and chat programs on the client computer devices drive the display shown to the chat participants. In some embodiments, the chat program may be, but is not limited to, a browser plug-in, a chat application integrated into an ecommerce website, an API connecting the ecommerce website with a secure payment system (SPS), and any other program capable of performing the steps described herein.

In the example embodiment, a first participant uses a first client computer device to view an ecommerce website. The ecommerce website is associated with a merchant and allows users to purchase items, such as products and services, online and receives payment for those products and services via a payment portal. The ecommerce chat server receives a chat session initiation request from a first participant which includes a link to the ecommerce website and a participant identifier for a second participant for a chat session. The ecommerce chat server transmits an invitation to join the chat session to the second participant via a second client computer device associated with the second participant. In some embodiments, the invitation is transmitted via a text message with a link to the chat session. In other embodiments, the invitation is transmitted via one or more messages through the ecommerce chat server, where the second participant is already logged into another chat session. When the ecommerce chat server receives an invitation acceptance message from the second participant, the ecommerce chat server initiates the chat session between the first and second participants. In the example embodiment, the ecommerce chat server allows text and images to be transmitted between the first client computer device and the second client computer device, where text and images are displayed on the first client computer device and the second client computer device in association with a chat window.

In the example embodiment, the first participant is the leader of the chat session. The ecommerce chat server retrieves, from the first client computer device, a view (also known as screen) of the ecommerce website that is currently being displayed on the first client computer device. The ecommerce chat server displays the retrieved view on a second client computer device. More specifically, the ecommerce chat server queries the first client computer device as to the view being displayed on the screen and transmits instructions to the second client computer device to display an identical view.

When the first participant changes the view of the ecommerce website being displayed on the first client computer device, the ecommerce chat server retrieves the view being currently displayed on the first client computer device and displays that view on the second client computer device. In the example embodiment, to display the view of ecommerce website, the ecommerce chat server opens up the ecommerce website in a browser on the second client computer device to the same location as is being displayed on the first client computer device.

In the example embodiment, the ecommerce chat server queues the website page on the second client computer device to show at the same position in the webpage as on the first client computer device. For example, if the first participant clicks on a product on the ecommerce website to bring up a description of the product, the ecommerce chat server displays the description of the product on the second client computer device. In another example, if the first participant scrolls down on a page on the ecommerce website, the ecommerce chat server instructs the second client computer device to display the page as it is being scrolled down. The ecommerce chat server allows the first participant to relinquish leadership of the chat session and assign leadership to another participant. The ecommerce chat server is configured to display the view of the leader of the chat session.

In another embodiment, the ecommerce chat server is configured to receive a signal from the first client computer device indicating that the first participant wants to share his or her current view and information about that view. The ecommerce chat server causes a message to be displayed in the chat window stating that the first participant wants to share his or her display. When the second participant agrees, the ecommerce chat server causes the view to be displayed on the second client computer device. In this embodiment, the ecommerce chat server could share either participant's view with the other participant.

In a further embodiment, the first participant transmits a picture of an item to the ecommerce chat server. The ecommerce chat server identifies the item from the picture. The ecommerce chat server then transmits a view of the item in an ecommerce website to the second participant via the second client computer device. In some embodiments, the first participant transmits a participant identifier along with the image and the ecommerce chat server opens a chat session between the first and second participants. In other embodiments, the chat session is already in existence when the first participant transmits the image.

In yet another embodiment, the first participant transmits an item identifier from a catalog or other source to the ecommerce chat server. In this embodiment, the ecommerce chat server determines and transmits a view of the item in an ecommerce website to the second participant via the second client computer device.

While the above description only describes a first and second participant, the ecommerce chat server allows a plurality of participants to participate in the chat session. The ecommerce chat server retrieves the view from the client computer device from the participant who is leading the chat session and causes that participant's view to be displayed on the client computer devices associated with the other participants.

In the example embodiment, the ecommerce chat server is in communication with the ecommerce website and a secure payment system (SPS). When participating in a chat session, the ecommerce website allows at least one of the participants in the chat to place products in an electronic shopping cart for purchase. When the participants decide to pay for the transaction, one of the participants transmits a signal to the ecommerce website. The ecommerce chat server receives a total purchase amount from the ecommerce website and displays the total purchase amount in the chat window.

The SPS receives payment information from a first participant including a first amount paid. The ecommerce chat server receives an indication of the first amount paid from the SPS and displays a message in the chat window showing that the first participant paid the first amount. The ecommerce chat server displays a difference between a total amount paid and the total purchase amount in the chat window. When the ecommerce chat server receives an indication of an additional amount paid from one of the participants, the ecommerce chat server displays that the participant paid the additional amount. For example, if there are four participants in the chat session, each of the four participants might contribute a quarter of the total purchase amount. The ecommerce chat server adds each additional amount paid to the total amount paid and compares the new total amount paid to the total purchase amount. If the total amount paid is less than the total purchase amount, then ecommerce chat server displays the total amount paid and the difference in the chat window and waits for more payment. Once the total amount paid equals the total purchase price, the ecommerce chat server retrieves the funds for the total amount paid from the SPS. The ecommerce chat server completes the payment transaction and transfers the funds to the ecommerce website to complete for the payment transaction.

In other embodiments, the SPS receives payment information from the other participants transferring a contribution amount to the first participant. The contribution amount represents the other participant's contributions to the purchase of the items associated with the payment transaction. An account associated with the first participant receives the contribution amount. The first participant completes the payment transaction on ecommerce website using a payment card or other source of money (e.g., a bank account). In some embodiments, the first participant completes the payment transaction and then receives contributions from the other participants for the completed transaction.

The methods and systems described herein may be implemented using computer programming or engineering techniques including computer software, firmware, hardware, or any combination or subset. As disclosed above, at least one technical problem with prior systems is allowing multiple participants in diverse locations to participate in an ecommerce transaction. The systems and methods described herein address that technical problem. The technical effect of the systems and processes described herein is achieved by performing at least one of the following steps: (a) initiating, by an ecommerce chat server, a chat session between at least a first client computer device associated with a first participant and a second client computer device associated with a second participant by (i) receiving, from the first client computer device, a chat session initiation request including an indication of an ecommerce website and a second participant identifier; (ii) transmitting, to the second client computer device associated with the second participant identifier, an invitation to the chat session; (iii) receiving, from the second client computer device, an invitation acceptance message; (iv) transmitting, to the second client computer device, the indication of the ecommerce website; and (v) initiating the chat session between the first client computer device and the second client computer device; (b) sharing, by the ecommerce chat server, at least one view of an ecommerce website with the first client computer device and the second client computer device, wherein the first client computer device and the second client computer device are configured to display the at least one view of the ecommerce website, and wherein the at least one view includes at least one purchasable item; (c) receiving, from the first client computer device, a view of the ecommerce website; (d) transmitting, to the second client computer device, the view of the ecommerce website, wherein the second client computer device is configured to display the view of the ecommerce website; (e) receiving, from the first client computer device, an updated view of the ecommerce website; (f) transmitting, to the second client computer device, the updated view of the ecommerce website, wherein the second client computer device is configured to display the updated view of the ecommerce website; (g) initiating, by the ecommerce chat server, a purchase transaction for the at least one purchasable item included in the at least one view; (h) receiving payment information for the purchase transaction; receiving, from the ecommerce website, a total purchase amount for the purchase transaction initiated by the first participant; (i) receiving, from a secure payment system, the first payment information that the first participant paid a first amount, wherein the first amount is less than the total purchase amount; (j) determining that the first amount is less than the total purchase price amount; (k) calculating a difference between the first amount and the total purchase price; (l) transmitting, to the first client computer device and the second client computer device, the calculated difference; (m) receiving, from the secure payment system, the second payment information that the second participant paid a second amount; (n) determining that the second amount is equal to the calculated difference based on the second payment information; and (o) completing the purchase transaction based on the determination. The resulting technical effect is that multiple participants may participate in the same ecommerce transaction through a chat session.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party transaction card industry system 120 for enabling ordinary payment-by-card transactions in which merchants 124 and card issuers 130 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone or through a web or ecommerce portal. The request may also be performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
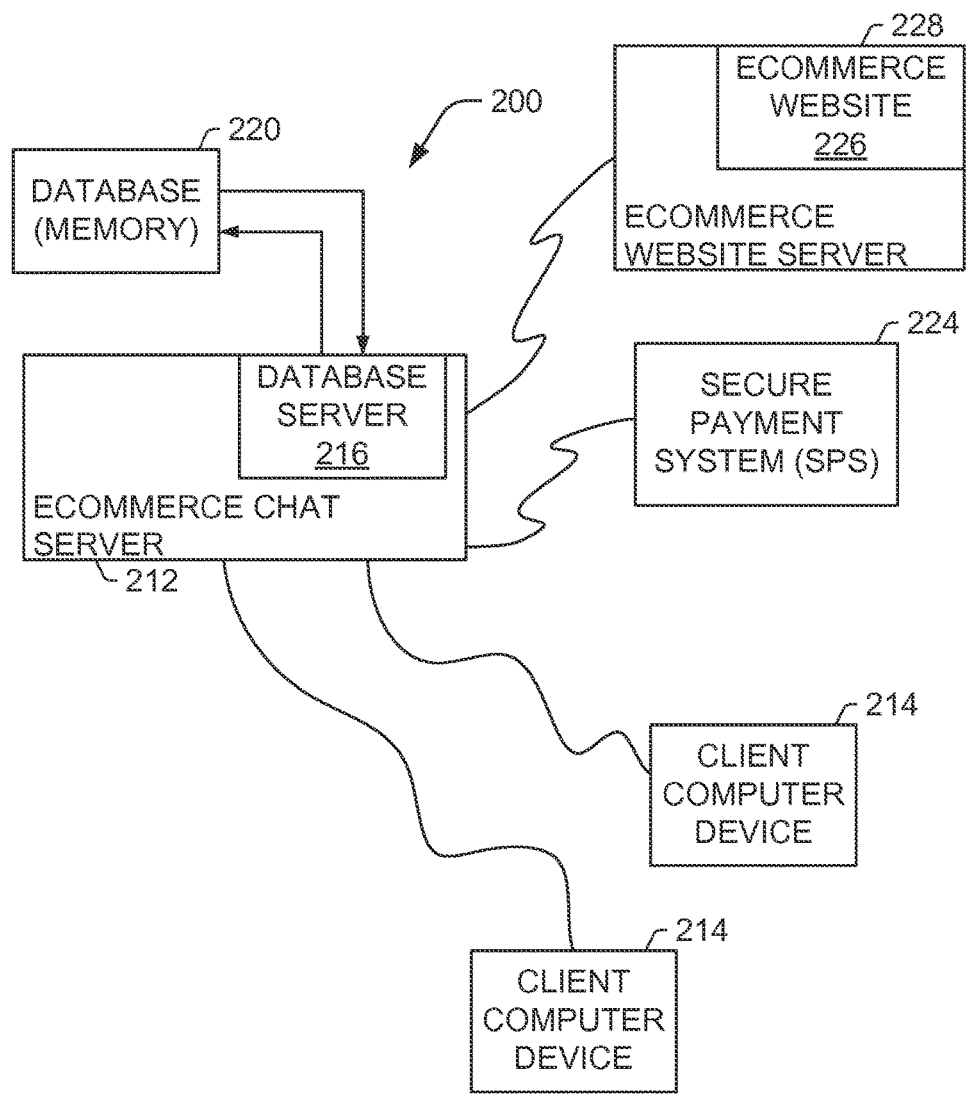

FIG. 2 is a simplified block diagram of an example system 200 used for managing a group chat during an ecommerce transaction. In the example embodiment, system 200 may be used for performing chat communication between multiple participants, guiding ecommerce website navigation for the multiple participants, and performing ecommerce payment transactions for multiple participants. In addition, system 200 is a chat communication system that includes an ecommerce chat server 212 configured to manage a group chat session during an ecommerce transaction. As described below in more detail, ecommerce chat server 212 is configured to manage chat communications between multiple participants, guide ecommerce website navigation for the multiple participants, and process payment transactions for the ecommerce website where multiple participants each pay a portion of the total transaction amount to merchant 124 (shown in FIG. 1).

In the example embodiment, client computer devices 214 are computers that include a web browser or a software application, which enables client computer devices 214 to access ecommerce chat server 212 using the Internet. More specifically, client computer devices 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client computer devices 214 can be any device capable of accessing the Internet including, but not limited to, a desktop computer, a laptop computer, a personal digital assistant (PDA), a cellular phone, a smartphone, a tablet, a phablet, or other web-based connectable equipment.

A database server 216 is communicatively coupled to a database 220 that stores data. In one embodiment, database 220 includes transaction information from a plurality of cardholders and paths based on those transactions. In the example embodiment, database 220 is stored remotely from ecommerce chat server 212. In some embodiments, database 220 is decentralized. In the example embodiment, a person can access database 220 via client computer devices 214 by logging onto ecommerce chat server 212, as described herein.

Ecommerce chat server 212 is communicatively coupled with the client computer devices 214. In some embodiments, ecommerce chat server 212 may be associated with, or is part of the payment system, or in communication with the payment card system payment network 120, shown in FIG. 1. In other embodiments, ecommerce chat server 212 is associated with a third party and is merely in communication with the payment network 120. In some embodiments, ecommerce chat server 212 may be associated with, or be part, of an ecommerce website 226.

A Secure Payment System (SPS) 224 is communicatively coupled with ecommerce chat server 212. Ecommerce chat server 212 allows client computer devices 214 to access SPS 224 through a chat window. In the example embodiment, SPS 224, also known as a digital wallet, stores payment card information and shipping information about cardholder 122 (shown in FIG. 1). SPS 224 allows cardholder 122 to use this stored information to quickly perform transactions, such as at an ecommerce website 226. In other embodiments, SPS 224 is a portal to payment processing network 120, which allows cardholder 122 to enter payment card information to pay for goods and services or to transfer funds to different accounts. In the example embodiment, SPS 224 is associated with payment processing network 120. In other embodiments, SPS 224 is a part of merchant bank 126, interchange network 128, or issuer bank 130 (all shown in FIG. 1).

One or more ecommerce website servers 228 are communicatively coupled with ecommerce chat server 212. The one or more ecommerce website servers 228 include each include at least one ecommerce website 226 and are associated with a merchant 124. Ecommerce website 226 displays products and services of one or more merchants 124 that may be purchased through an online payment portal (not shown) associated with ecommerce website server 228. In the example embodiment, ecommerce website server 228 is communicatively coupled with payment network 120 through ecommerce chat server 212. In other embodiments, ecommerce website server 228 is associated with or a part of a payment network 120.

In some embodiments, ecommerce chat server 212 may be associated with a financial transaction interchange network 128. In addition, at least one of client computer devices 214 may include a computer system associated with an issuer of a transaction card. Accordingly, ecommerce chat server 212 and client computer devices 214 may be utilized to process transaction data relating to purchases a cardholder makes utilizing a transaction card processed by the interchange network and issued by the associated issuer. At least one client computer device 214 may be associated with a user or a cardholder seeking to register, access information, or process a transaction with at least one of the interchange network, the issuer, or the merchant.

Figure 3:
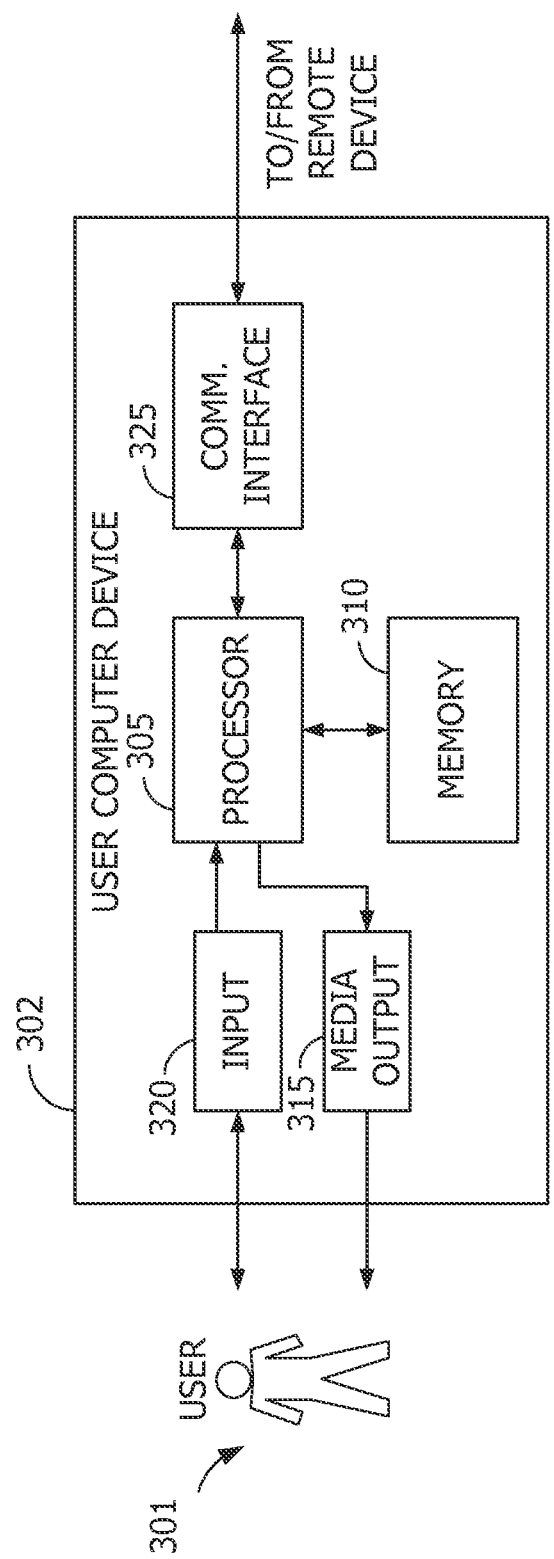

FIG. 3 illustrates an example configuration of a client computer device 214 shown in FIG. 2, in accordance with one embodiment of the present disclosure. User computer device 302 is operated by a user 301. User computer device 302 may include, but is not limited to, client computer devices 214 (shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server system 212 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from ecommerce chat server 212. A client application allows user 301 to interact with, for example, ecommerce chat server 212. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
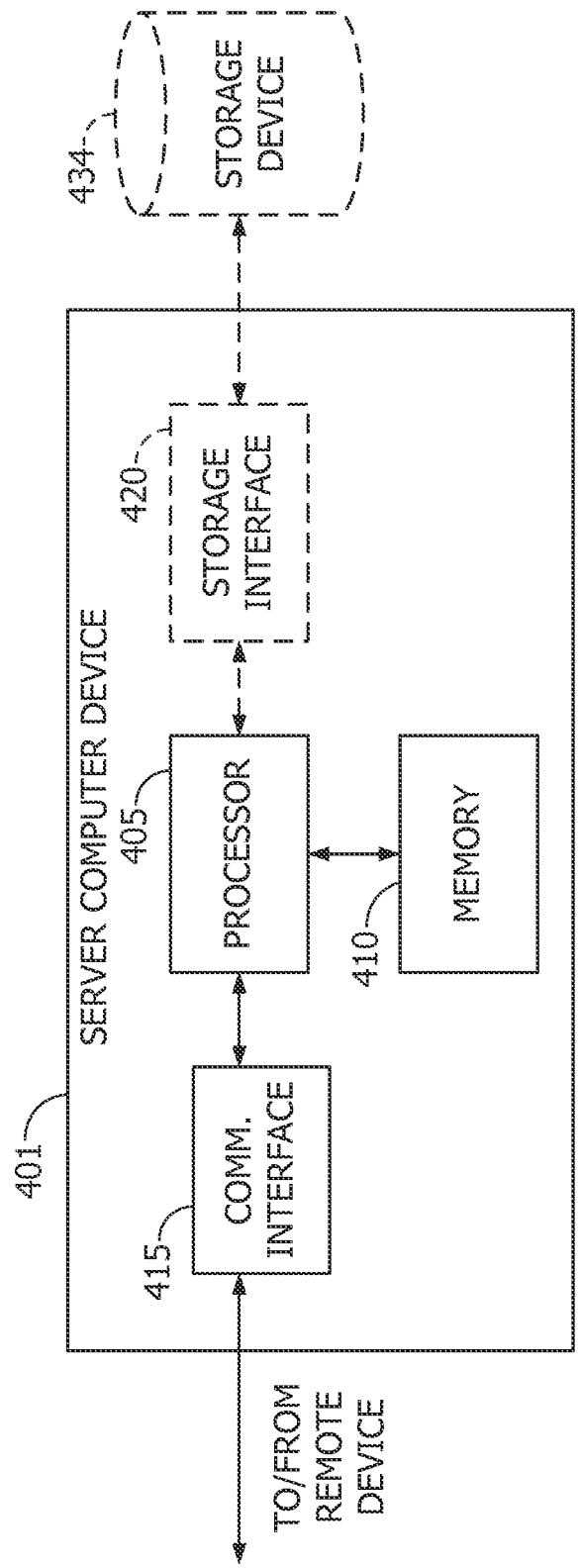

FIG. 4 illustrates an example configuration of the server system shown in FIG. 2, in accordance with one embodiment of the present disclosure. Server computer device 401 may include, but is not limited to, database server 216, ecommerce chat server 212, and ecommerce website server 228 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, or client computer devices 214 (shown in FIG. 2). For example, communication interface 415 may receive requests from client computer devices 214 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Figure 6:
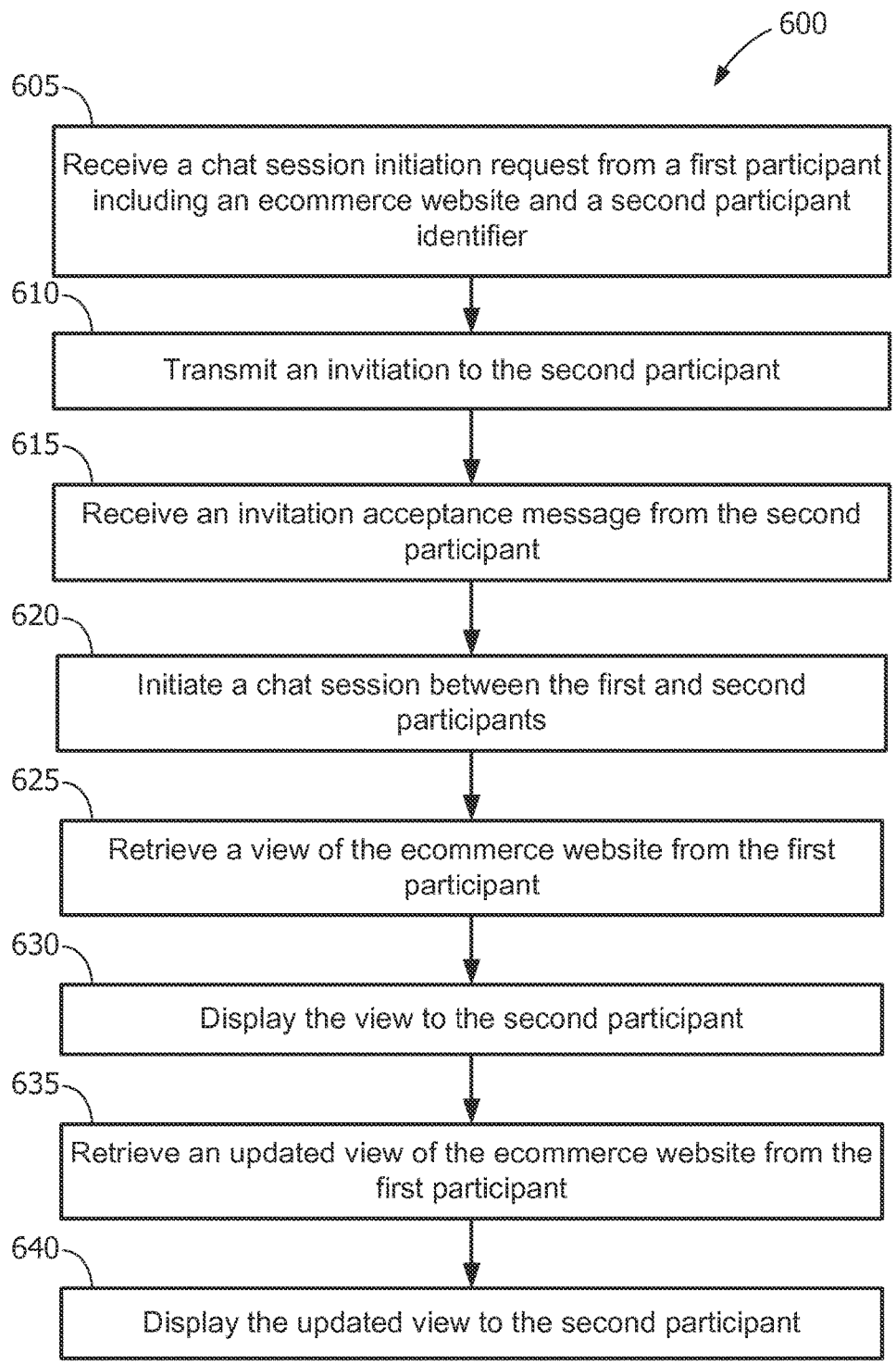
Figure 7:
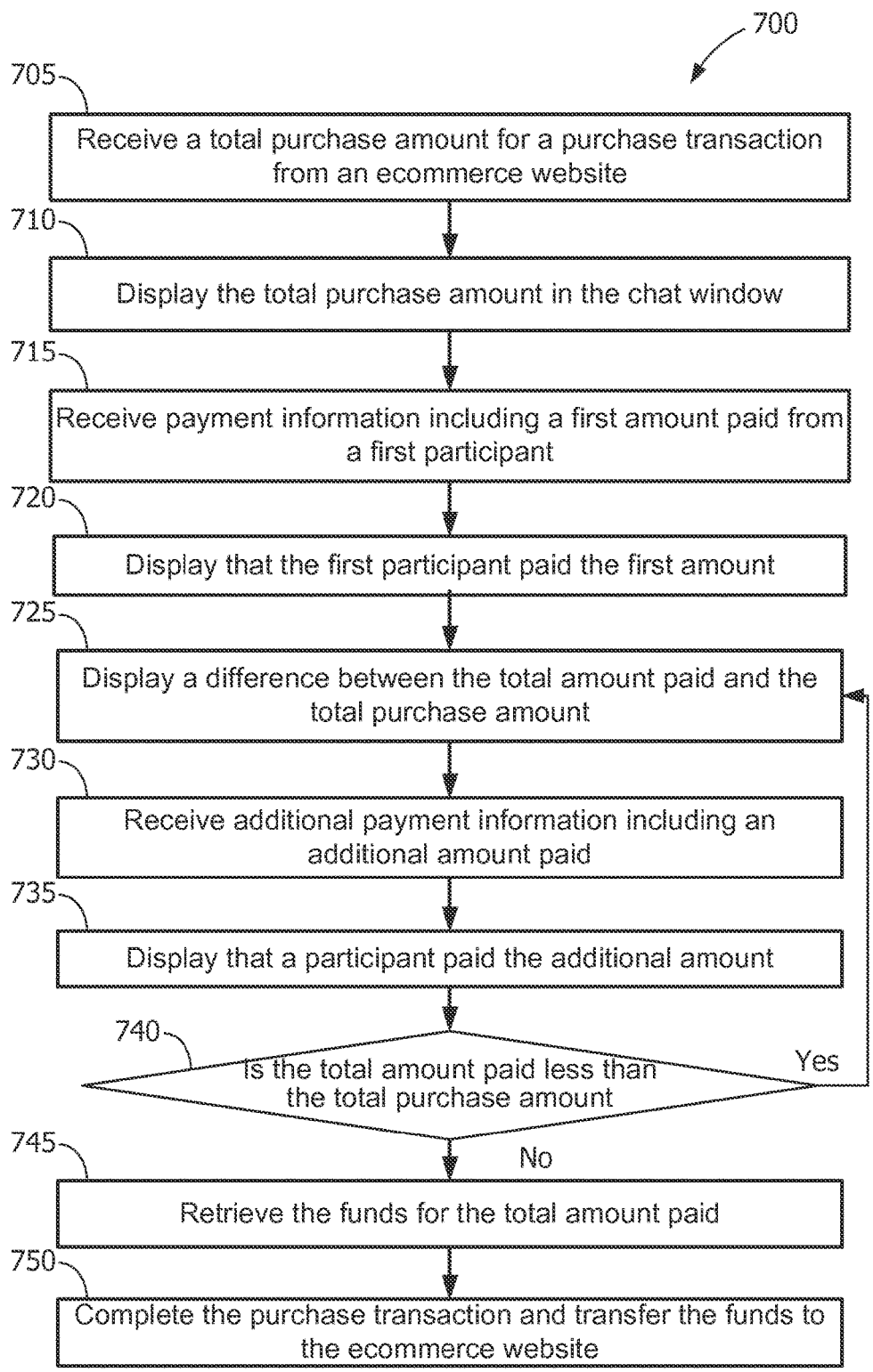

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with the instruction such as illustrated in FIGS. 5-7.

Figure 5:
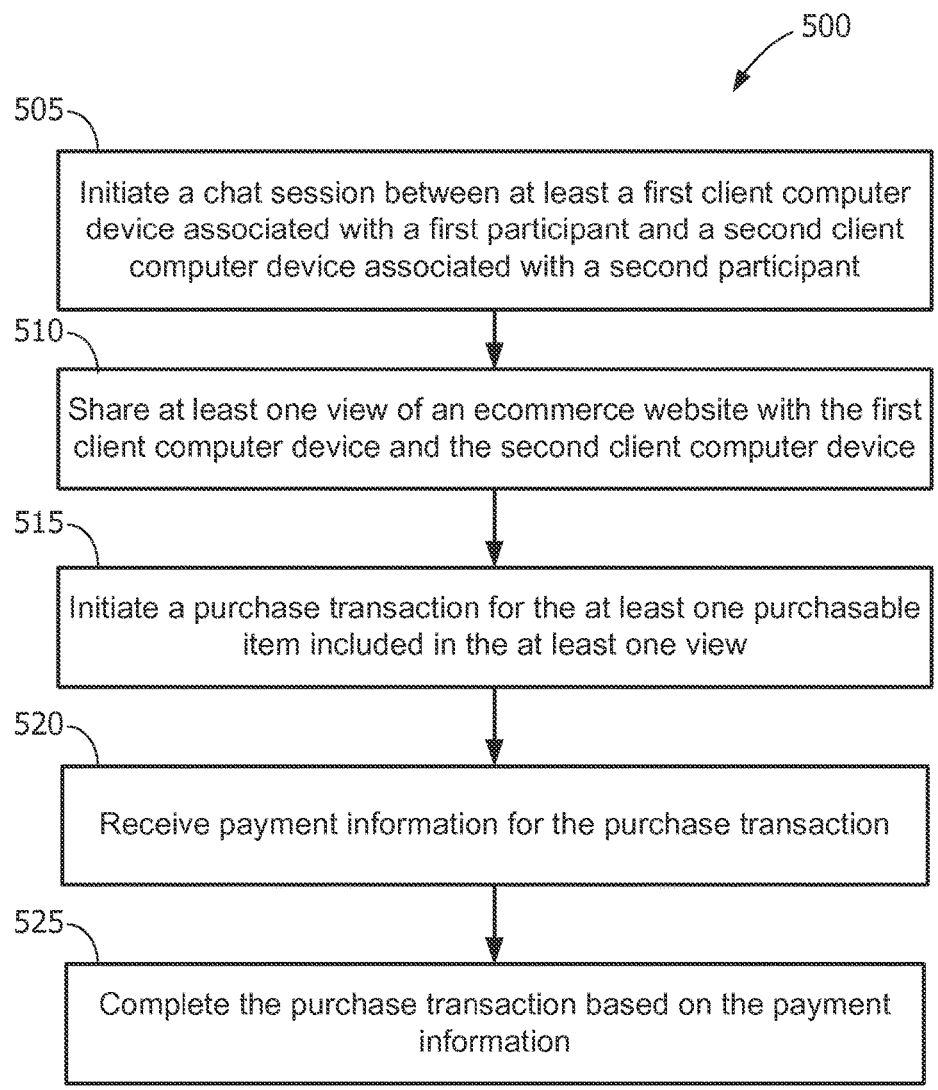

FIG. 5 is a flowchart illustrating an example of a process 500 of managing a chat session and a payment transaction while navigating ecommerce website 226 (shown in FIG. 2) using system 200 shown in FIG. 2, in accordance with one embodiment of the disclosure. Process 500 may be implemented by a computing device, for example ecommerce chat server 212 (shown in FIG. 2). In the example embodiment, ecommerce chat server 212 is in communication with ecommerce website server 228 and SPS 224 (shown in FIG. 2).

In some embodiments, ecommerce chat server 212 controls a client chat application on client computer devices 214 (shown in FIG. 2) that allows ecommerce chat server 212 to control the display of client computer devices 214 during a chat session between the client computer devices 214. In other embodiments, ecommerce chat server 212 transmits instructions to the client computer devices 214 participating in the chat session and chat programs on the client computer devices 214 drive the display shown to the chat participants. In some embodiments, the chat program may be, but is not limited to, a browser plug-in, a chat application integrated into an ecommerce website, an API connecting the ecommerce website with a secure payment system (SPS), and any other program capable of performing the steps described herein.

In the example embodiment, a first participant uses a first client computer device, which can be one of client computer device 214 shown in FIG. 2, to view ecommerce website 226 (shown in FIG. 2). Ecommerce website 226 is associated with merchant 124 (shown in FIG. 1) and allows users to purchase items, such as products and services, online and receives payment for those products and services via a payment portal.

In the example embodiment, ecommerce chat server 212 initiates 505 a chat session between a first client computer device associated with a first participant and a second client computer device (which can also be one of client computer device 214) associated with a second participant. Ecommerce chat server 212 shares 510 at least one view of ecommerce website 226 with the first client computer device and the second client computer device. For example, the first client computer device is viewing a shoe shopping ecommerce website 226. Ecommerce chat server 212 receives information pertaining to the view of the shoe shopping ecommerce website 226 that the first client computer device is currently viewing. Ecommerce chat server 212 transmits information to the second client computer device so that the second client computer device will display the same view of shoe shopping ecommerce website 226 that the first client computer device is currently viewing. Ecommerce website 226 includes at least one purchasable item that is included in at least one of the views displayed on the first client computer device and the second client computer device. For example, shoe shopping ecommerce website 226 includes at least one pair of purchasable shoes.

Ecommerce chat server 212 initiates 515 a purchase transaction for the at least one purchasable item. The purchase transaction includes a total amount (or cost) for the items associated with the purchase transaction. In some embodiments, the purchase transaction is initiated by one of the client computer devices 214 that are participating the chat session. For example, one of the chat participants places a pair of red shoes into the shopping cart on ecommerce website 226 and selects checkout.

Ecommerce chat server 212 receives 520 payment information for the purchase transaction. In the example embodiment, ecommerce chat server 212 receives 520 payment information for the payment transaction from SPS 224. Payment information includes one or more payment amounts. In some embodiments, multiple chat participants pay portions of the total amount of the transaction. In the example embodiment, each chat participant initiates payment via SPS 224 through ecommerce chat server 212. When ecommerce chat server 212 receives payment information indicating that the total amount has been paid, then ecommerce chat server 212 completes 525 the purchase transaction. In the example embodiment, ecommerce chat server 212 transfers the funds from the SPS to ecommerce website server 228 to complete 525 the purchase transaction.

FIG. 6 is a flowchart illustrating an example of a process 600 of initiating and managing a chat session while navigating ecommerce website 226 (shown in FIG. 2) using system 200 shown in FIG. 2, in accordance with one embodiment of the disclosure. Process 600 may be implemented by a computing device, for example ecommerce chat server 212 (shown in FIG. 2). In the example embodiment, ecommerce chat server 212 is in communication with ecommerce website server 228 and SPS 224 (shown in FIG. 2).

In the example embodiment, a first participant uses a first client computer device, which can be one of client computer device 214 shown in FIG. 2, to view ecommerce website 226 (shown in FIG. 2). Ecommerce website 226 is associated with merchant 124 (shown in FIG. 1) and allows users to purchase items, such as products and services, online and receives payment for those products and services via a payment portal.

In the example embodiment, ecommerce chat server 212 receives 605 a chat session initiation request from a first participant which includes a link to ecommerce website 226 and a participant identifier for a second participant for a chat session. Ecommerce chat server 212 transmits 610 an invitation to join the chat session to the second participant via a second client computer device (which can also be one of client computer device 214) associated with the second participant. In some embodiments, the invitation is transmitted via a text message with a link to the chat session. In other embodiments, the invitation is transmitted via one or more messages through ecommerce chat server 212, where the second participant is already logged into another chat session. When ecommerce chat server 212 receives 615 an invitation acceptance message from the second participant, ecommerce chat server 212 initiates 620 the chat session between the first and second participants. In the example embodiment, ecommerce chat server 212 allows text and images to be transmitted between the first client computer device and the second client computer device, where text and images are displayed on the first client computer device and the second client computer device in a chat window.

In the example embodiment, the first participant is the leader of the chat session. Ecommerce chat server 212 retrieves 625, from the first client computer device, a view (also known as screen) of ecommerce website 226 that is currently being displayed on the first client computer device. Ecommerce chat server 212 displays 630 the retrieved view on the second client computer device associated with the second participant. More specifically, ecommerce chat server 212 queries the first client computer device as to the view being displayed on the screen and transmits instructions to the second client computer device to display an identical view.

When the first participant changes the view of ecommerce website 226 being displayed on the first client computer device, ecommerce chat server 212 retrieves 635 the view being currently displayed on the first client computer device and displays 640 that view on the second client computer device. In the example embodiment, to display the view of ecommerce website 226, ecommerce chat server 212 opens up ecommerce website 226 in a browser on the second client computer device to the same location as is being displayed on the first client computer device.

In the example embodiment, ecommerce chat server 212 queues the website page on the second client computer device to show at the same position in the webpage as on the first client computer device. For example, if the first participant clicks on a product on ecommerce website 226 to bring up a description of the product, ecommerce chat server 212 displays the description of the product on the second client computer device. In another example, if the first participant scrolls down a page on ecommerce website 226, ecommerce chat server 212 display the page on the second client computer device as it is being scrolled down. Ecommerce chat server 212 allows the first participant to relinquish leadership of the chat session and assign leadership to another participant. Ecommerce chat server 212 is configured to display the view of the leader of the chat session.

In another embodiment, ecommerce chat server 212 is configured to receive a signal from the first client computer device indicating that the first participant wants to share his or her current view and information about that view. Ecommerce chat server 212 causes a message to be displayed in the chat window stating that the first participant wants to share his or her display. When the second participant agrees, ecommerce chat server 212 causes the view to be displayed on the second client computer device. In this embodiment, ecommerce chat server 212 could share either participant's view with the other participant.

In a further embodiment, the first participant transmits a picture of an item to ecommerce chat server 212. Ecommerce chat server 212 identifies the item from the picture. Ecommerce chat server 212 then transmits a view of the item in ecommerce website 226 to the second participant via the second client computer device. In some embodiments, the first participant transmits a participant identifier along with the image and ecommerce chat server 212 opens a chat session between the first and second participants. In other embodiments, the chat session is already in existence when the first participant transmits the image.

In yet another embodiment, the first participant transmits an item identifier from a catalog or other source to ecommerce chat server 212. In this embodiment, ecommerce chat server 212 determines and transmits a view of the item in ecommerce website 226 to the second participant via the second client computer device.

While the above description only describes a first and second participant, ecommerce chat server 212 allows a plurality of participants to participate in the chat session. Ecommerce chat server 212 retrieves the view from the client computer device from the participant who is leading the chat session and causes that participant's view to be displayed on the client computer devices associated with the other participants.

FIG. 7 is a flowchart illustrating an example of a process 700 of managing receiving contributions from more than one cardholder to pay for a payment transaction on ecommerce website 226 (shown in FIG. 2) using system 200 shown in FIG. 2, in accordance with one embodiment of the disclosure. Process 700 may be implemented by a computing device, for example ecommerce chat server 212 (shown in FIG. 2). In the example embodiment, ecommerce chat server 212 is in communication with ecommerce website 226 and SPS 224 (shown in FIG. 2).

When participating in a chat session as described in FIGS. 5 and 6, ecommerce website 226 allows at least one of the participants in the chat to place products in an electronic shopping cart for purchase. When the participants decide to pay for the transaction, one of the participants transmits a signal to ecommerce website 226. Ecommerce chat server 212 receives 705 a total purchase amount from ecommerce website 226 and displays 710 the total purchase amount in the chat window.

SPS 224 receives payment information from a first participant including a first amount paid. Ecommerce chat server 212 receives 715 an indication of the first amount paid from SPS 224 and displays 720 a message in the chat window showing that the first participant paid the first amount. Ecommerce chat server displays 725 a difference between a total amount paid and the total purchase amount in the chat window. When ecommerce chat server 212 receives 730 an indication of an additional amount paid from one of the participants, ecommerce chat server 212 displays 735 that the participant paid the additional amount. For example, if there are four participants in the chat session, each of the four participants might contribute a quarter of the total purchase amount. Ecommerce chat server 212 adds the additional amount paid to the total amount paid and compares 740 the new total amount paid to the total purchase amount. If the total amount paid is less than the total purchase amount, then ecommerce chat server 212 returns to Step 725 and displays 725 the total amount paid and the total purchase amount in the chat window. Once the total amount paid equals the total purchase price, ecommerce chat server 212 retrieves 745 the funds for the total amount paid from SPS 224. Ecommerce chat server 212 completes 750 the payment transaction and transfers the funds to ecommerce website 226 to complete for the payment transaction.

In other embodiments, SPS 224 receives payment information from the other participants transferring a contribution amount to the first participant. The contribution amount represents the other participant's contributions to the purchase of items associated with the payment transaction. An account associated with the first participant receives the contribution amount. The first participant completes the payment transaction on ecommerce website 226 using a payment card or other source of money (e.g., a bank account). In some embodiments, the first participant completes the payment transaction and then receives contributions from the other participants for the completed transaction.

Figure 8:
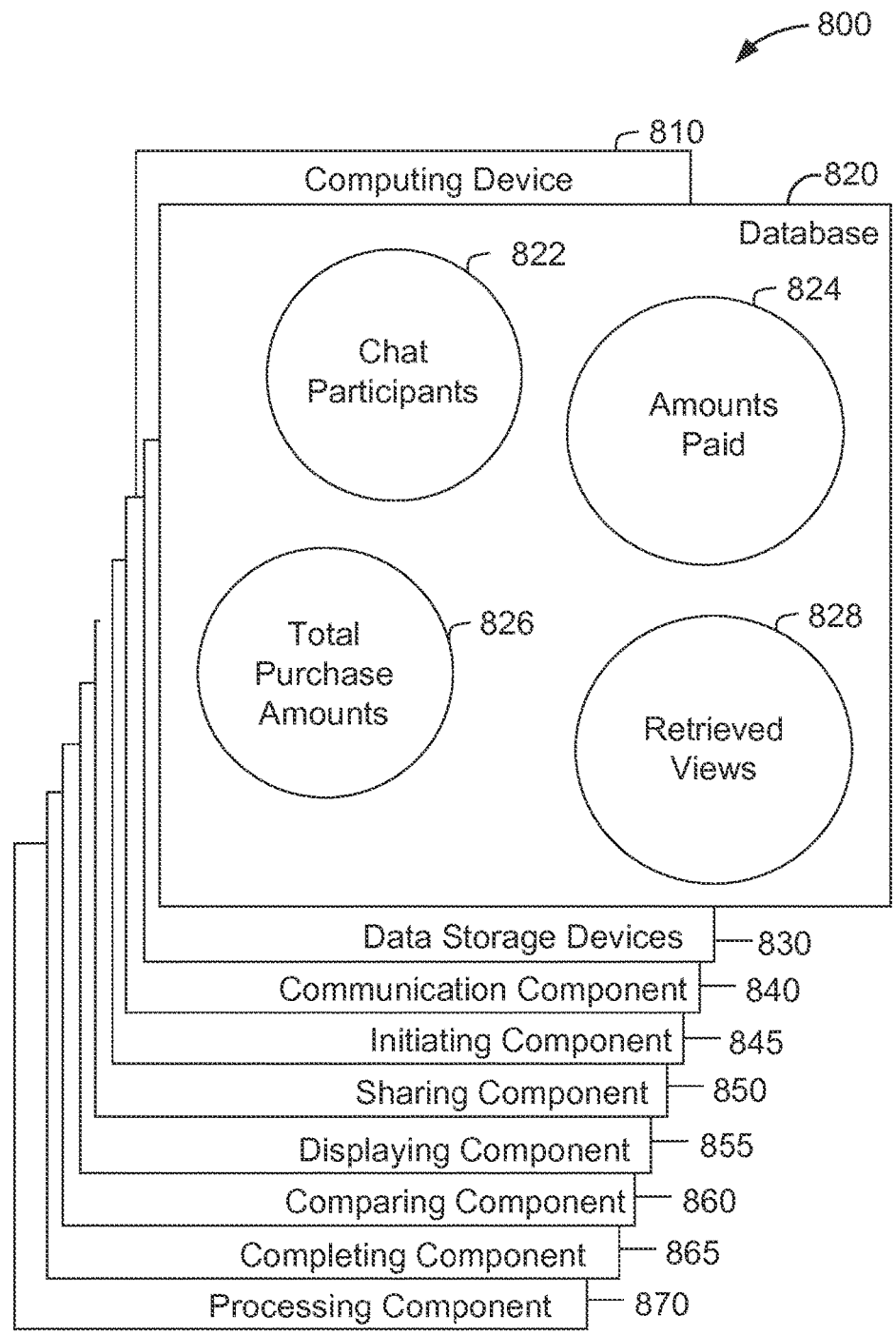

FIG. 8 is a diagram 800 of components of one or more example computing devices that may be used in the system 200 shown in FIG. 2. In some embodiments, computing device 810 is similar to ecommerce chat server 212 (shown in FIG. 2). Database 820 may be coupled with several separate components within computing device 810, which perform specific tasks. In this embodiment, database 820 includes chat participants 822, amounts paid 824, total purchase amounts 826, and retrieved views 828. In some embodiments, database 820 is similar to database 220 (shown in FIG. 2).

Computing device 810 includes the database 820, as well as data storage devices 830. Computing device 810 also includes a communication component 840 for receiving 520 payment information (shown in FIG. 5), receiving 605 a chat session request, transmitting 610 an invitation, receiving 615 an invitation acceptance valuation request, retrieving 625 a view, retrieving 635 a different view (all shown in FIG. 6), receiving 705 a total purchase amount, receiving 715 an indication of a first amount paid, receiving 730 an indication of a second amount paid, and retrieving 745 the funds (shown in FIG. 7). Computing device 810 also includes an initiating component 845 for initiating 505 a chat session, initiating 515 a purchase transaction (both shown in FIG. 5), and initiating 620 a chat session (shown in FIG. 5). Computer device 810 further includes a sharing component 850 for sharing 510 at least one view (shown in FIG. 5). A displaying component 855 is also included for displaying 630 the view and displaying 640 the updated view (both shown in FIG. 6), displaying 710 the total purchase amount, displaying 720 that the first participant paid the first amount, displaying 725 a difference between the total amount paid and the total purchase amount, and displaying 735 that a participant paid an additional amount (shown in FIG. 7). Computing device 810 further includes a comparing component 860 for comparing 740 the total amount paid to the total purchase amount, as shown in FIG. 7. Moreover, a completing component 865 is included for completing 525 the purchase transaction (shown in FIG. 5) and completing 750 the purchase transaction, as shown in FIG. 7. A processing component 870 assists with execution of computer-executable instructions associated with the system.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer implemented method for managing a group chat during an ecommerce session, said method implemented using an ecommerce chat server in communication with a memory, said method comprising:

initiating, by the ecommerce chat server, a chat session between at least a first client computer device associated with a first participant and a second client computer device associated with a second participant;

sharing, by the ecommerce chat server, at least one view of an ecommerce website with the first client computer device and the second client computer device, wherein the at least one view of the ecommerce website is i) received, by the ecommerce chat server, from the first client computer device and ii) transmitted, by the ecommerce chat server, to the second client computer device, wherein the first client computer device and the second client computer device are configured to display the at least one view of the ecommerce website, and wherein the at least one view of the ecommerce website includes at least one purchasable item;

initiating, by the ecommerce chat server, a purchase transaction for the at least one purchasable item included in the at least one view of the ecommerce website;

receiving payment information for the purchase transaction; and completing the purchase transaction based on the payment information.

2. The method in accordance with claim 1, wherein initiating a chat session further comprises:

receiving, from the first client computer device, a chat session initiation request including an indication of an ecommerce website and a second participant identifier;

transmitting, to the second client computer device associated with the second participant identifier, an invitation to the chat session;

receiving, from the second client computer device, an invitation acceptance message;

transmitting, to the second client computer device, the indication of the ecommerce website; and initiating the chat session between the first client computer device and the second client computer device.

3. The method in accordance with claim 1, further comprising:

receiving, from the first client computer device, an updated view of the ecommerce website; and transmitting, to the second client computer device, the updated view of the ecommerce website, wherein the second client computer device is configured to display the updated view of the ecommerce website.

4. The method in accordance with claim 1, wherein sharing at least one view of an ecommerce website further comprises:
receiving, from the first client computer device, an image including an item;
determining a view of the ecommerce website that includes the item based on the image; and
transmitting, to the second client computer device, the determined view of the ecommerce website, wherein the second client computer device is configured to display the determined view of the ecommerce website.

5. The method in accordance with claim 1, wherein sharing at least one view of an ecommerce website further comprises:
receiving, from the first client computer device, an item identifier associated with the purchasable item;
determining a view of the ecommerce website including the purchasable item associated with the item identifier; and
transmitting, to the second client computer device, the view of the ecommerce website.

6. The method in accordance with claim 1, wherein the payment information includes a first payment information and a second payment information, and further comprising:
receiving, from the ecommerce website, a total purchase amount for the purchase transaction initiated by the first participant;
receiving, from a secure payment system, the first payment information that the first participant paid a first amount, wherein the first amount is less than the total purchase amount;
receiving, from the secure payment system, the second payment information that the second participant paid a second amount; and
completing the purchase transaction based on the second payment information.

7. The method in accordance with claim 6, further comprising:
determining that the first amount is less than the total purchase amount;
calculating a difference between the first amount and the total purchase amount; and
transmitting, to the first client computer device and the second client computer device, the calculated difference.

8. The method in accordance with claim 7, further comprising:
determining that the second amount is equal to the calculated difference based on the second payment information; and
completing the purchase transaction based on the determination.

9. An ecommerce chat server for managing a group chat during an ecommerce session, said ecommerce chat server comprising one or more processors communicatively coupled to one or more memory devices, said ecommerce chat server configured to:
initiate a chat session between at least a first client computer device associated with a first participant and a second client computer device associated with a second participant;
share at least one view of an ecommerce website with the first client computer device and the second client computer device, wherein the at least one view of the ecommerce website is i) received, by the ecommerce chat server, from the first client computer device and ii) transmitted, by the ecommerce chat server, to the second client computer device, wherein the first client computer device and the second client computer device are configured to display the at least one view of the ecommerce website, and wherein the at least one view of the ecommerce website includes at least one purchasable item;
initiate a purchase transaction for the at least one purchasable item included in the at least one view of the ecommerce website;
receive payment information for the purchase transaction; and
complete the purchase transaction based on the payment information.

10. The ecommerce chat server in accordance with claim 9, wherein said ecommerce chat server is further configured to:
receive, from the first client computer device, a chat session initiation request including an indication of an ecommerce website and a second participant identifier;
transmit, to the second client computer device associated with the second participant identifier, an invitation to the chat session;
receive, from the second client computer device, an invitation acceptance message;
transmit the indication of the ecommerce website to the second client computer device; and
initiate the chat session between the first client computer device and the second client computer device.

11. The ecommerce chat server in accordance with claim 9, wherein said ecommerce chat server is further configured to:
receive, from the first client computer device, an updated view of the ecommerce website; and
transmit, to the second client computer device, the updated view of the ecommerce website, wherein the second client computer device is configured to display the updated view of the ecommerce website.

12. The ecommerce chat server in accordance with claim 9, wherein said ecommerce chat server is further configured to:
receive, from the first client computer device, an image including an item;
determine a view of the ecommerce website that includes the item based on the image; and
transmit, to the second client computer device, the determined view of the ecommerce website, wherein the second client computer device is configured to display the determined view of the ecommerce website.

13. The ecommerce chat server in accordance with claim 9, wherein said ecommerce chat server is further configured to:
receive, from the first client computer device, an item identifier associated with the purchasable item;
determine a view of the ecommerce website including the purchasable item associated with the item identifier; and
transmit, to the second client computer device, the view of the ecommerce website.

14. The ecommerce chat server in accordance with claim 9, wherein the payment information includes a first payment information and a second payment information, and wherein said ecommerce chat server is further configured to:

receive, from the ecommerce website, a total purchase amount for the purchase transaction initiated by the first participant;

receive, from a secure payment system, the first payment information that the first participant paid a first amount, wherein the first amount is less than the total purchase amount;

receive, from the secure payment system, the second payment information that the second participant paid a second amount; and complete the purchase transaction based on the second payment information.

15. The ecommerce chat server in accordance with claim 14, wherein said ecommerce chat server is further configured to:

determine that the first amount is less than the total purchase amount;

calculate a difference between the first amount and the total purchase amount; and transmit, to the first client computer device and the second client computer device, the calculated difference.

16. The ecommerce chat server in accordance with claim 15, wherein said ecommerce chat server is further configured to:

determine that the second amount is equal to the calculated difference based on the second payment information; and complete the purchase transaction based on the determination.

17. At least one non-transitory computer-readable storage medium having computer-executable instructions embodied thereon, wherein when executed by an ecommerce chat server having at least one processor coupled to at least one memory device, the computer-executable instructions cause the processor to:

initiate a chat session between at least a first client computer device associated with a first participant and a second client computer device associated with a second participant;

share at least one view of an ecommerce website with the first client computer device and the second client computer device, wherein the at least one view of the ecommerce website is i) received, by the ecommerce chat server, from the first client computer device and ii) transmitted, by the ecommerce chat server, to the second client computer device, wherein the first client computer device and the second client computer device are configured to display the at least one view of the ecommerce website, and wherein the at least one view of the ecommerce website includes at least one purchasable item;

initiate a purchase transaction for the at least one purchasable item included in the at least one view of the ecommerce website;

receive payment information for the purchase transaction; and complete the purchase transaction based on the payment information.

18. The at least one computer-readable storage medium of claim 17, wherein the payment information includes a first payment information and a second payment information, and wherein the computer-executable instructions further cause the processor to:

receive, from the ecommerce website, a total purchase amount for the purchase transaction initiated by the first participant;

receive, from a secure payment system, the first payment information that the first participant paid a first amount, wherein the first amount is less than the total purchase amount;

determine that the first amount is less than the total purchase amount;

calculate a difference between the first amount and the total purchase amount;

transmit, to the first client computer device and the second client computer device, the calculated difference;

receive, from the secure payment system, the second payment information that the second participant paid a second amount;

determine that the second amount is equal to the calculated difference based on the second payment information; and complete the purchase transaction based on the determination.

19. The at least one computer-readable storage medium of claim 17, wherein the computer-executable instructions further cause the processor to:

receive, from the first client computer device, an updated view of the ecommerce website; and transmit, to the second client computer device, the updated view of the ecommerce website, wherein the second client computer device is configured to display the updated view of the ecommerce website.

20. The at least one computer-readable storage medium of claim 17, wherein the computer-executable instructions further cause the processor to:

receive, from the first client computer device, an image including an item;

determine a view of the ecommerce website that includes the item based on the image; and transmit, to the second client computer device, the determined view of the ecommerce website, wherein the second client computer device is configured to display the determined view of the ecommerce website.

* * * * *